United States Patent [19]
Kaczmarczyk

[11] Patent Number: 5,919,513
[45] Date of Patent: *Jul. 6, 1999

[54] DIETARY FIBER COMPOSITION

[76] Inventor: Sabina W. Kaczmarczyk, E. Main St., Somerville, N.J. 08876

[*] Notice: This patent is subject to a terminal disclaimer.

[21] Appl. No.: 08/964,944

[22] Filed: Nov. 5, 1997

Related U.S. Application Data

[63] Continuation-in-part of application No. 08/829,083, Mar. 31, 1997, Pat. No. 5,747,093.

[51] Int. Cl.⁶ .......................... A23L 1/212; A23L 1/0534
[52] U.S. Cl. .......................... 426/617; 426/93; 426/548; 426/573
[58] Field of Search .............. 426/93, 548, 573, 426/617

[56] References Cited

U.S. PATENT DOCUMENTS

| | | | |
|---|---|---|---|
| 512,050 | 4/1894 | Walker et al. | 426/617 |
| 1,060,912 | 5/1913 | Lasby | 426/617 |
| 4,098,912 | 7/1978 | Mercado-Flores et al. | 426/617 |
| 4,619,831 | 10/1986 | Sharma . | |
| 5,073,370 | 12/1991 | Meer et al. . | |
| 5,516,524 | 5/1996 | Kais et al. . | |

*Primary Examiner*—Helen Pratt
*Attorney, Agent, or Firm*—Kenneth P. Glynn, Esq.

[57] ABSTRACT

A sucrose-free, artificial sweetener-free dietary fiber composition contains about 5 to about 95 percent methylcellulose by weight based on total weight of the composition, about 5 to about 75 percent natural coconut, and about 5 to about 75 percent banana. In some embodiments, about 20 to about 80 percent non-sucrose, non-artificial sweetener containing, inactive materials. The inactive materials include particulate filler materials, such as powered natural grains. In one preferred embodiment, the invention is a sucrose-free, non-allergenic dietary fiber composition, containing about 5 to about 95 percent methylcellulose, balance being about 5 to 75 percent natural coconut and about 5 to 75 percent banana, based on the total weight of the methylcellulose, the coconut and the banana. More preferably, there is about 5 to about 40 percent methylcellulose balance being natural coconut and banana in the preceding ranges.

16 Claims, No Drawings

5,919,513

DIETARY FIBER COMPOSITION

REFERENCE TO RELATED APPLICATION

This application is a Continuation-In-Part of U.S. patent application Ser. No. 08/829,083, filed on Mar. 31, 1997, now U.S. Pat. No. 5,747,093 and entitled "Sucrose-Free Dietary Fiber Composition", by the inventor herein.

BACKGROUND OF THE INVENTION

1. Field of the Invention

The present invention relates to dietary supplements for regularity, and more particularly, to substantially sucrose-free, artificial sweetener-free dietary compositions containing methylcellulose, coconut and banana. In one preferred composition, only non-allergenic constituents are used.

2. Information Disclosure Statement

The following represents teachings relating to fiber-based dietary supplements:

U.S. Pat. No. 4,619,831 issued to Shri C. Sharma, on Oct. 28, 1986, describes a dietary fiber composition which is prepared by coating an insoluble fiber with a soluble fiber. The insoluble fiber is preferably derived from cereal bran by enzymatically and chemically purifying the bran. The soluble fiber is preferably pectin or an alginate. The dietary fiber composition can be used to prepare low calorie, high fiber content dietary food products.

U.S. Pat. No. 5,073,370 issued to E. Harvey Meer et al, on Dec. 17, 1991, describes a natural fiber laxative that is provided which consists of psyllium husk, apple fiber, fructose, gum arabic and flavorants. The psyllium husk and the apple fiber constitute together at least 75% by weight of the composition. The granular components are controlled to have a particle size less than that determined by a No. 50 mesh, thereby improving mouthfeel. The composition is, in addition to being all natural, low in calorie and high in fiber and when mixed with water has a palatable mouthfeel.

U.S. Pat. No. 5,516,524 issued to Theresa M. Kais et al, on May 14, 1996 describes an ingestible laxative composition which comprises specified amounts of dioctyl sulfosuccinate and bulk fiber selected from the group consisting of psyllium, methylcellulose, polycarbophil, calcium polycarbophil, bran, malt soup extract, karaya, guar gum, and mixtures thereof, preferably in single dose form.

A product known as Citrucel® distributed by SmithKline Beecham Consumer Healthcare, L.P., Pittsburgh, Pa., is a methylcellulose fiber therapy for regularity which includes methylcellulose, a nonallergenic fiber, as the active ingredient and includes fruit flavors, citric acid, sucrose and other inactives. Their sugar-free product under the same trademark contains an artificial sweetener as well as natural fruit flavors.

Notwithstanding the above prior art, there are no teachings or suggestions that would render the present invention anticipated or obvious, wherein sucrose-free dietary compositions are based on methylcellulose-coconut banana mixtures.

SUMMARY OF THE INVENTION

A sucrose-free, artificial sweetener-free dietary fiber composition contains about 5 to about 95 percent methylcellulose by weight based on total weight of the composition, about 5 to about 75 percent natural coconut, and about 5 to about 75 percent banana. In some embodiments, about 20 to about 80 percent non-sucrose, non-artificial sweetener containing, inactive materials. The contents are preferably in fine powder form. The inactive materials include particulate filler materials, such as powdered natural grains. In one preferred embodiment, the invention is a sucrose-free, non-allergenic dietary fiber composition, consisting essentially of about 5 to about 95 percent methylcellulose, balance being about 5 to 75 percent natural coconut and about 5 to 75 percent banana, based on the total weight of the methylcellulose, the coconut and the banana. More preferably, there is about 5 to about 40 percent methylcellulose balance being natural coconut and banana in the preceding ranges.

DETAILED DESCRIPTION OF THE PRESENT INVENTION

For about three decades there has been an increased awareness among consumers regarding the benefits of high fiber content diets. These benefits include apparent decreases in intestinal and colon diseases, including cancer. Additionally, fiber products are used as therapy for regularity and are often used in place of other laxative products. As described above, the prior art is replete with edible fibrous cellulose products. However, they contain oils, sucrose, fat syrups, acids such as citric acid, fruits and sweeteners.

The primary objectives of the present invention are to provide dietary fiber compositions which exclude any significant amounts of sucrose or artificial sweetener and provide good taste and vitamins. The purpose of the present invention is multifold: (1) to provide a substantially sugar-free, artificial sweetener-free product to consumers who require fiber therapy for regularity and who philosophically abhor sugar intake; (2) to provide non-allergenic products for people who have needs for fiber therapy for regularity and require non-allergenic products; and, (3) to provide substantially sugar-free products to people who require sugar-free diets, such as people who do not tolerate sugar-containing products, as well as hyperglycemics and hypoglycemics. The term "sugar-free" used herein refers to no sugar except to the extent that the banana-coconut constituents contain natural sucrose and/or fructose, sometimes, therefore, referred to herein as substantially sugar-free. Further, a secondary purpose of the present invention is to provide the aforesaid products in a non-allergenic form.

Thus, one embodiment of the present invention involves compositions essentially consisting of only methylcellulose and natural coconut and banana. These compositions typically contain about 5 to 95 percent methylcellulose, balance being about 5 to 75 percent natural coconut, and about 5 to 75 percent banana, based on the total weight of the methylcellulose, the natural coconut and the banana. Typically, there is about 10 to 70 percent methylcellulose, balance being natural coconut and banana. The methylcellulose, as well as the natural coconut and banana are in powdered form. In another embodiment, preservatives may be included to extend the life of the coconut. Such additives include BHT or other known preservatives within the skill of the artisan.

In yet another embodiment of the present invention, the compositions include methylcellulose, coconut, banana and inactive materials. These inactive materials are non-sucrose containing non-artificial sweetener materials. That is, there are no sucrose or artificial sweeteners in these inactives. Thus the composition includes about 5 to about 95 percent methylcellulose, about 5 to about 75 percent natural coconut, about 5 to about 75 percent banana, and about 20 to about 80 percent additional inactive materials. These additional materials may be particulate fillers, or nutrients, vitamins or other additives. The fillers may be natural grains such as wheat, corn, barley, rye oats or mixtures thereof. In one preferred embodiment, the composition contains about 10 to about 40 percent methylcellulose, about 5 to about 50 percent natural coconut, about 5 to about 50 percent banana, and about 20 to about 50 percent non-sucrose containing inactive materials. Active materials may also be included without exceeding present scope of invention, but are non-essential and not preferred.

The above compositions generally cannot be consumed dry, and should be mixed with water or other liquids. Thus, with the composition of the present invention, consumers enjoy sucrose-free, artificial sweetener-free, beneficial dietary fiber supplements with the enjoyment of coconut flavor.

The following examples are representative of the present invention:

EXAMPLE 1

| CONTENT | AMOUNT (g) | % |
|---|---|---|
| methylcellulose | 34 | 50 |
| powdered coconut | 17 | 25 |
| powered banana | 17 | 25 |

EXAMPLE 2

| CONTENT | AMOUNT (g) | % |
|---|---|---|
| methylcellulose | 15 | 30 |
| powdered coconut | 20 | 40 |
| powered banana | 15 | 30 |

EXAMPLE 3

| CONTENT | AMOUNT (g) | % |
|---|---|---|
| methylcellulose | 20 | 20 |
| powdered coconut | 10 | 10 |
| powered banana | 10 | 10 |
| powdered rye oat | 60 | 60 |

EXAMPLE 4

| CONTENT | AMOUNT (g) | % |
|---|---|---|
| methylcellulose | 15 | 15 |
| powdered coconut | 15 | 15 |
| powered banana | 30 | 30 |
| powdered wheat | 30 | 30 |
| riboflavin | 5 | 5 |
| powdered corn | 4 | 4 |
| ascorbic acid | 1 | 1 |

It can be now seen that the present invention compositions provide fiber, moisture and good flavor, in a sugar-free fashion, while providing vitamins and minerals associated with coconuts and bananas, including magnesium and potassium.

Obviously numerous modifications and variations of the present invention are possible in light of the above teachings. It is therefore understood that within the scope of the appended claims, the invention may be practiced otherwise than as specifically described herein.

What is claimed is:

1. A sucrose-free, artificial sweetener-free dietary fiber composition which comprises:

(a) about 5 to about 95 percent methylcellulose by weight based on total weight of the composition;

(b) about 5 to about 75 percent natural coconut; and, (c) about 5 to about 75 percent banana.

2. The composition of claim 1 wherein said coconut is powdered coconut.

3. The composition of claim 1 further containing a preservative to extend shelf life of the composition.

4. The composition of claim 1 wherein said composition is a fine powered mixture.

5. The composition of claim 1 which contains about 10 to about 70 percent methylcellulose.

6. The composition of claim 1 which contains about 5 to about 40 percent natural coconut.

7. The composition of claim 1 which contains about 5 to about 40 percent banana.

8. The composition of claim 1 which further contains:

(d) about 20 to about 80 percent non-sucrose-containing, non-artificial sweetener-containing, inactive materials.

9. The composition of claim 1 wherein said inactive materials include particulate filler materials.

10. The composition of claim 9 wherein said filler materials are selected from the group consisting of powered natural grains of wheat, corn, barley, rye oats and mixtures thereof.

11. The composition of claim 8 which contains about 5 to about 50 percent coconut.

12. The composition of claim 8 which contains about 5 to about 50 percent banana.

13. The composition of claim 8 which contains about 20 to about 50 percent non-sucrose containing inactive materials.

14. A sucrose-free, artificial sweetener-free non-allergenic dietary fiber composition, which consists essentially of:

about 5 to about 95 percent methylcellulose, about 5 to about 75 percent natural coconut, and about 5 to about 75 percent banana based on the total weight of the methylcellulose, coconut and banana.

15. The composition of claim 14 wherein there is about 2 to about 40 percent methylcellulose, balance being natural coconut, and banana.

16. The composition of claim 14 further containing a preservative to extend shelf life of the composition.

* * * * *